July 28, 1942.   J. E. HARVEY, JR   2,291,332
SOLVENTS FROM COAL TAR
Filed Aug. 14, 1940
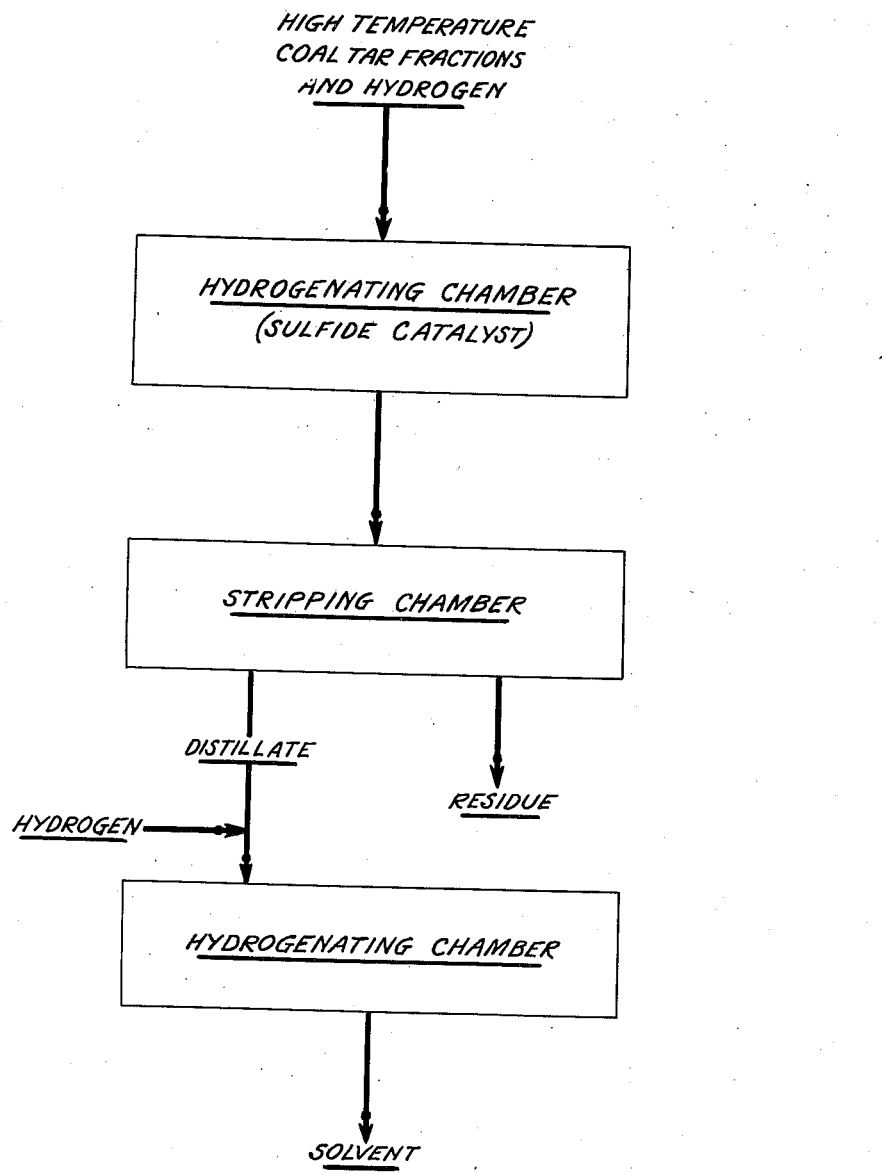
Inventor
Jacquelin E. Harvey, Jr.
By Browne & Phelps
Attorneys Patented July 28, 1942

2,291,332

UNITED STATES PATENT OFFICE 2,291,332

SOLVENTS FROM COAL TAR

Jacquelin E. Harvey, Jr., Atlanta, Ga., assignor of one-half to Southern Wood Preserving Company, East Point, Ga., a corporation of Georgia Application August 14, 1940, Serial No. 352,654

4 Claims. (Cl. 196—53)

This invention relates to the enhanced production of solvents.

More specifically, the present invention relates to the enhanced induction of solvency in tars of aromatic content and fractions thereof, including pitches and stripped tars.

An object of the present invention is the enhanced induction of solvency in tars of aromatic content and fractions thereof by the step-wise action of hydrogen, as more fully explained in the following.

A further object of the invention is the enhanced induction of solvency by catalytic means with added provision of maintaining catalysis at optimum conditions.

Further objects of the present invention will become apparent from the following disclosures.

Starting materials of the present process are tars of aromatic content derived from coal, wood, petroleum, gas and/or gases and fractions derived therefrom. Especially attractive as a starting material is tar or fractions derived from coal, as for instance coke oven tar, gas house tar, or low temperature tar. These tars derived from coal, and more especially coke oven tar, are characterized by the presence of high molecular complexes that are so susceptible to thermal degradation that the solvents of the present invention cannot be provided by a single action of hydrogen but must be produced in step-wise manner as hereinafter described. According to the process of the present invention it is further possible, by recycling operations, to convert substantially the entirety of the starting materials remaining liquid into solvents of enhanced value.

It has been found that the induction of solvency, as hereinafter described, is maintained at optimum rate when catalyzed by a sulfide catalyst, provided that said catalyst be maintained at least to a degree substantially in sulphide form. An important part of the present invention consists of maintaining at least a portion of a sulphide catalyst in sulfide form whereby to enhance induction of solvency as compared to induction of solvency that flows from a catalyzed reaction wherein the entirety of the sulfide catalyst is changed to another form, as for instance the oxide or metal.

The invention will be understood from the following description of illustrative steps comprising various methods of securing the objects of the invention, when read in connection with the accompanying drawing wherein the figure is a diagrammatic sketch of an apparatus for carrying out a form of the process of the invention and wherein the nature of the step carried out in each chamber and the contents thereof are indicated by legend.

Example 1.—A high residue creosote having substantially 48% boiling at 355° C. and substantially 2% coke residue is charged to a high pressure autoclave with addition of one half of one percent sulphur based on creosote, and subjected to the action of hydrogen at 200 atmospheres pressure and a temperature of 400° C.; catalyst molybdenum sulfide; time of reaction, one hour. At the end of the hour period the beneficiated creosote is withdrawn from the autoclave and will be found to have reduced coke residue, specific gravity and viscosity. The beneficiated material is then distilled to an upper limit of 250° C. to provide the distillate as an intermediate starting material. The intermediate starting material is then subjected in the autoclave to the further action of hydrogen wherein temperature is 475° C. and the pressure 200 atmospheres; catalyst, molybdenum and chromium sulfide; one eighth of one percent sulphur is added to the intermediate starting material prior to being charged to the autoclave. Processing of the intermediate starting material is continued until samples withdrawn show that there has been induced an increment of low boiling fractions in excess of fractional increment in the high boiling range and the beneficiated material has a solvency in excess of its intermediate parent material.

The catalysts aforenamed were repeatedly used in recurring cycles of hydrogen action and maintained substantially their initial activity other than decrease expected through normal aging.

Some starting materials may contain sufficient sulfur to maintain the catalyst in substantial sulfide form, while others require the addition of sulphur thereto. It is difficult to define the sulphur content necessary, inasmuch as the starting materials vary in sulphur content. As a general rule it can be said that the maintenance of a hydrogen sulfide partial pressure of in the order of one atmosphere will suffice for maintaining the sulfide catalyst in substantial sulfide form, however, the hydrogen sulfide partial pressure in some cases will be satisfactory when maintained at a fractional atmosphere. Partial pressures of hydrogen sulfide of in excess of one atmosphere are usable. In the case of deficiency of sulphur or sulphur bearing material in the starting material whereby to generate hydrogen sulfide for catalyst maintenance, sulphur in any form capable of generating hydrogen sulfide may be added to the starting material.

Viewed broadly, the present invention provides the step of including a partial pressure of hydrogen sulfide of at least a fractional atmosphere whereby to enhance solvency induction when the present process is practiced in step-wise manner.

It is desirable but not entirely essential that the hydrogen sulfide atmosphere be maintained in both cycles of hydrogen action, inasmuch as enhanced reaction flows from the maintenance of said hydrogen sulfide atmosphere in only one cycle.

*Example 2.*—A coal tar, specific gravity 1.1641, coke residue in excess of 8% and boiling predominantly above 190° C. is passed through a high pressure reaction vessel while simultaneously flowing hydrogen and hydrogen sulfide therewith at a temperature of 410° C. and 350 atmosphere pressure; hydrogen sulfide partial pressure one atmosphere; catalyst tin sulfide; time of reaction, 75 minutes and the flow of hydrogen 12,000 cubic feet per barrel feed. The beneficiated tar is distilled to an upper limit of 260° C. to provide the distillate as an intermediate starting material. The intermediate starting material is then passed through a high pressure reaction vessel while simultaneously flowing hydrogen therewith; catalyst molybdenum sulfide; flow of hydrogen 6,000 cubic feet per barrel of feed stock; time of contact 2 minutes. The beneficiated material will be found to have a solvency in excess of its intermediate starting material and will be characterized by increment of low boiling fractions in excess of fractional increment in the high boiling range.

*Example 3.*—A tar fraction of aromatic content, initial boiling point substantially 220° C. and having substantially 50% residue above 355° C. is subjected to the action of hydrogen while contacting a cobalt sulfide catalyst. Temperature is maintained at 410° C. and a pressure at 400 atmospheres; time of contact, one hour; hydrogen sulfide partial pressure one and one-half atmospheres. The beneficiated material will be found to have a lowered coke residue, specific gravity, and viscosity, and condensation of boiling points toward the lower end. The beneficiated material is distilled to an upper limit of 320° C. with the distillate serving as the intermediate starting material. The intermediate starting material is subjected to the action of hydrogen and hydrogen sulfide while contacting a sulfide catalyst at a temperature of 465° C. and a pressure of 200 atmospheres; hydrogen sulfide partial pressure three-fourths of one atmosphere. The finally beneficiated material will be found to have a solvency in excess of its intermediate starting material and will be further characterized by an increment of low boiling fractions in excess of fractional increment in the higher boiling range.

*Example 4.*—A coal tar pitch specific gravity 1.23 and 15% boiling at 355° C. is subjected to the action of hydrogen and hydrogen sulphide at 375° C. and 200 atmospheres pressure; catalyst vanadium sulfide; the time of contact is one and one-half hours; hydrogen sulfide partial pressure two atmospheres. The beneficiated pitch is against subjected to an identical cycle of hydrogenation. The twice beneficiated pitch is distilled to an upper limit of 210° C. to provide a distillate as an intermediate starting material for solvents of the present invention. The distillate is then subjected to the action of hydrogen at 535° C. and a pressure of 200 atmospheres. The beneficiated distillate will be found to have a solvency in excess of its intermediate parent material and will be further characterized by an increment of low boiling fractions in excess of fractional increment in the higher boiling range.

In the step-wise action of hydrogen in the present invention, the first action of hydrogen on the starting material is characterized by reduction of coke residue, specific gravity, and viscosity in the starting material. In the first cycle of hydrogen action pressures as low as 50 atmospheres are usable as are temperatures as low as 200° C., however, higher temperatures and pressures are preferred, as for instance temperatures of 350–450° C. or thereabove and pressures of in excess of 200 atmospheres. Pressures and temperatures are, however, not restricted to any definite limitations inasmuch as hydrogen treatment that reduces the coke residue, specific gravity and viscosity of the starting material will proceed at lowered temperatures and pressures. The desired temperatures and pressures are those that will reduce coke residue, specific gravity, and viscosity in a commercial manner. When using continuous operation in the first hydrogen cycle flows of 10,000–15,000 cubic feet per barrel feed stock has proven satisfactory, however, higher and lower gas flows have proven effective.

In the last cycle of hydrogen action, as comprising a part of the present invention, for a given coordination of temperature and pressure as compared to the first cycle, the hydrogen flow in the last cycle is less than the flow in the first cycle. In the last cycle of hydrogen action pressures as low as 50 atmospheres are usable as are temperatures as low as 250° C. however, more elevated pressures and temperatures are preferred, as for instance, pressures of in excess of 200 atmospheres and temperatures chosen from the range between 300–750° C.

Aromatic tars of petroleum derivation or as produced from gas or gases serve as suitable starting materials. Tars or fractions thereof, at least once refined by hydrogen or other means also serve as starting materials.

By the term beneficiated as used herein and in the appended claims is meant the starting or intermediate starting material at least once subjected to the action of hydrogen in accordance with the present process.

All sulfide catalysts effective in the presence of hydrogen are usable, as for instance those of the 6th and 8th periodic groups in any form or shape, as for instance supported on carriers and promoted or not; other catalysts are usable therewith.

Other catalysts or materials influencing splitting or decomposition may be used in conjunction with aforesaid sulfide catalysts.

In both cycles of hydrogen action, the present process is predicated on so controlling the reaction conditions that ring structures are not opened with the subsequent formation of liquid chain or paraffin structures to the extent that the solvents of enhanced solvency of the present invention are impossible of manufacture.

In the cyclic action, hydrogen conditions are so controlled as to induce no substantial percentage of carbonaceous increment. When utilizing most of the starting materials, the first action of hydrogen is characterized by the depolymerization of high molecular complexes. By the term high molecular complexes is meant those high boiling fractions especially susceptible to thermal degradation.

In the second cycle of hydrogen action periods of as short as one minute at operating conditions have proven beneficial, however, longer periods may be used as for instance several minutes. As a general rule, it may be said that the time element in said second cycle is that period necessary to provide final increment of low boiling fractions in excess of fractional increment in the higher boiling range, whereby to induce solvency.

The hydrogen supply used in the present process may come from any convenient source, as for instance by the disassociation of methane. If desired any diluting gas may be used in connection with the hydrogen.

When the starting material has been subjected to the first cycle of hydrogen action that reduces coke residue, specific gravity and viscosity, the stripping of the beneficiated mass may be effected at any point desired as for instance 200° C., or higher, or lower. Generally the point of stripping is determined by the boiling range desired in the product flowing from the final action of hydrogen in the second cycle.

Within the limits of the boiling range of the finally beneficiated material, solvents and/or plasticizers may be fractionated therefrom, as for instance to provide substitutes for the boiling range or ranges of any of the following:

| Product: | Boiling range, °C. |
|---|---|
| Benzol | 78–120 |
| Toluol | 100–150 |
| Hi-flash naphtha | 150–200 |
| High boiling crudes | 150–290 |
| Plasticizers | 160–360 |

The residue incidental to stripping action, or any residue incidental to solvent or plasticizer recovery from the finally beneficiated intermediate starting material may be recycled for further product production. By such recycling operation the coke residue inherent to the starting material can be made to substantially finally disappear.

Starting materials include tars and fractions thereof derived from wood, coal, and petroleum including gases of carbon content; as for instance wood tar, pine tar, coke oven tar, gas house tar, water gas tar and synthetic aromatic tars derived from petroleum sources including gases containing carbon.

Starting materials previously subjected to the action of hydrogen are suitable starting materials.

In the disclosures herein made the removing of low boiling fractions by gas movement or pressure release is considered the equivalent of distillation.

When reference is made to high molecular complexes contained in the starting material, and when the starting material contains low boiling fractions that are not considered high molecular complexes, it is of course obvious that the high molecular complexes contained in the starting material are to a certain extent depolymerized by the solvent present.

Starting materials of the present process also include tars of aromatic content from which low boiling fractions have been removed, as for instance tars from which solvent oils have been removed. Viewed broadly, the starting materials of the present process include tars of aromatic content, fractions of said tar more viscous than the starting material due to removal of low boiling fractions, high boiling fractions and pitches.

The term coal tar as used herein means tar produced by high temperature carbonization of coal, as for instance, high temperature coke oven tar or gas house tar.

Minor changes may be made within the scope of the appended claims without departing from the spirit of the invention. In the claims affixed to this specification no selection of any particular modification is intended to the exclusion of other modifications thereof.

I claim:

1. In the production of solvents from a mixture of high temperature coal tar fractions, the process which comprises: subjecting said mixture of tar fractions to the action of a relatively high flow of hydrogen in excess of 10,000 cubic feet per barrel material treated whilst contacting a metallic sulfide catalyst, at a pressure in excess of about 200 atmospheres, a temperature selected between the limits of 350–450° C., and for such a length of time as to reduce coke residue and specific gravity, the while maintaining a hydrogen sulfide partial pressure selected between the limits of about 1 and 2 atmospheres; stripping low boiling fractions from the beneficiated material and subjecting at least a portion of said low boiling fractions to the action of a relatively low flow of hydrogen at superatmospheric pressure and a temperature selected between the range of 475–535° C.; and continuing the phase of the process last named for such a length of time as to provide a material of increased solvency.

2. In the production of solvents from a mixture of high temperature coal tar fractions, the process which comprises: subjecting said mixture of tar fractions to the action of a relatively high flow of hydrogen in excess of 10,000 cubic feet per barrel material treated whilst contacting a molybdenum sulfide catalyst, at a pressure in excess of about 200 atmospheres, a temperature selected between the limits of 300–450° C., and for such a length of time as to reduce coke residue and specific gravity, the while maintaining a hydrogen sulfide partial pressure selected between the limits of about 1 and 2 atmospheres; stripping low boiling fractions from the beneficiated material and subjecting at least a portion of said low boiling fractions to the action of a relatively low flow of hydrogen at superatmospheric pressure and a temperature selected between the range of 475–535° C.; and continuing the phase of the process last named for such a length of time as to provide a material of increased solvency.

3. In the production of solvents from a mixture of high temperature coal tar fractions, the process which comprises: subjecting said mixture of tar fractions to the action of a relatively high flow of hydrogen in excess of 10,000 cubic feet per barrel material treated whilst contacting a tin sulfide catalyst, at a pressure in excess of about 200 atmospheres, a temperature selected between the limits of 350–450° C., and for such a length of time as to reduce coke residue and specific gravity, the while maintaining a hydrogen sulfide partial pressure selected between the limits of about 1 and 2 atmospheres; stripping low boiling fractions from the beneficiated material and subjecting at least a portion of said low boiling fractions to the action of a relatively low flow of hydrogen at superatmospheric pressure and a temperature selected between the range of 475–535° C.; and continuing the phase of the process last named for such a length of time as to provide a material of increased solvency.

4. In the production of solvents from a mixture of high temperature coal tar fractions, the process which comprises: subjecting said mixture of tar fractions to the action of a relatively high flow of hydrogen in excess of 10,000 cubic feet par barrel material treated whilst contacting a cobalt sulfide catalyst, at a pressure in excess of about 200 atmospheres, a temperature selected between the limits of 350-450° C., and for such a length of time as to reduce coke residue and specific gravity, the while maintaining a hydrogen sulfide partial pressure selected between the limits of about 1 and 2 atmospheres; stripping low boiling fractions from the beneficiated material and subjecting at least a portion of said low boiling fractions to the action of a relatively low flow of hydrogen at superatmospheric pressure and a temperature selected between the range of 475-535° C.; and continuing the phase of the process last named for such a length of time as to provide a material of increased solvency.

JACQUELIN E. HARVEY, Jr.